L. COSTA.
NUTCRACKER.
APPLICATION FILED MAR. 13, 1914.
1,123,852. Patented Jan. 5, 1915.
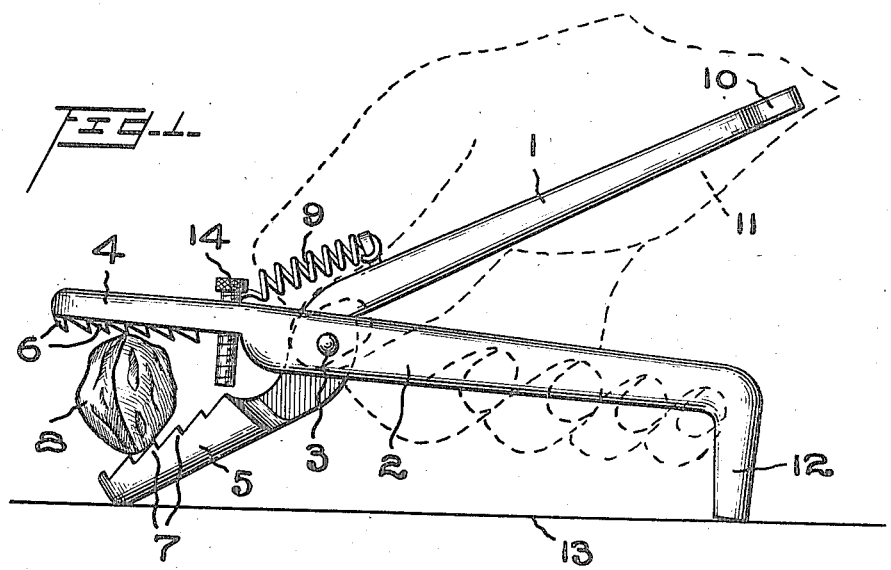
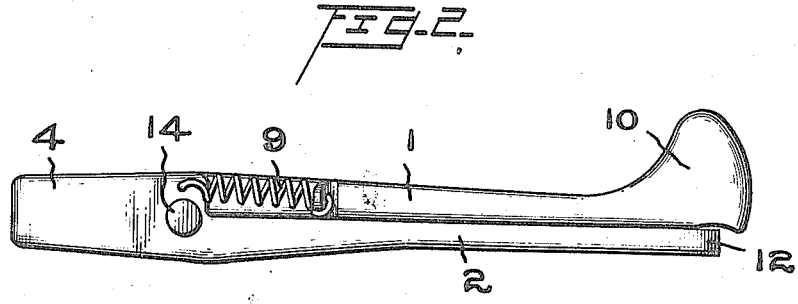
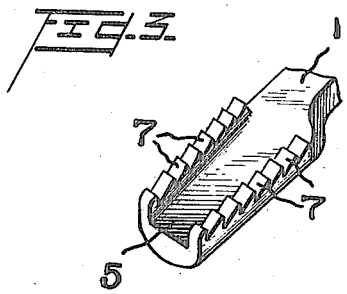 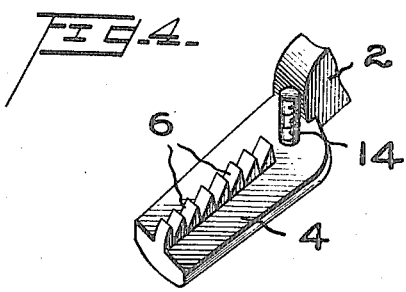
Witnesses
L. P. Moyer
C. R. Ziegler
Inventor
Louis Costa
By Joshua R. H. Potts
Attorney

UNITED STATES PATENT OFFICE.

LOUIS COSTA, OF PHILADELPHIA, PENNSYLVANIA.

NUTCRACKER.

1,123,852.  Specification of Letters Patent.  Patented Jan. 5, 1915.

Application filed March 13, 1914. Serial No. 824,387.

*To all whom it may concern:*

Be it known that I, LOUIS COSTA, a citizen of the United States, residing at Philadelphia, in the county of Philadelphia and State of Pennsylvania, have invented certain new and useful Improvements in Nutcrackers, of which the following is a specification.

My invention relates to improvements in nut crackers, the object of the invention being to provide a nut cracker which will permit the nuts to be cracked and prevent possibility of crushing the nuts.

A further object is to provide improved adjustable means for limiting the closing movement of the jaws, and provide improved means whereby the device may be located against a support and pressure applied thereupon to assist the gripping action of the hand in breaking a nut.

With these and other objects in view, the invention consists in certain novel features of construction and combinations and arrangements of parts as will be more fully hereinafter described and pointed out in the claims.

In the accompanying drawings: Figure 1 is a view in side elevation illustrating my improved nut cracker in operative position. Fig. 2 is a plan view of the device, and Figs. 3 and 4 are fragmentary perspective views of the two jaws.

My improved nut cracker comprises two members 1 and 2 connected by a pivot pin 3 extending through both members between their ends. The shorter ends of the members constitute jaws 4 and 5 respectively adapted to crack a nut between them.

The jaw 4 is provided on its inner face with a central longitudinal series of relatively sharp teeth 6, and the other jaw 5 is provided along its outer edges with longitudinal series of sharp teeth 7. When the nut 8 is positioned between the jaws, the three sets of teeth 6 and 7 exert pressure upon the nut in different planes so that the tendency of the jaw 4 is to force its teeth against the central portion of the nut while the tendency of the jaw 5 is to force its teeth against the outer portions of the nut. These teeth are positioned at an angle as shown so that the nut is held and not squeezed outwardly when the jaws are moved toward each other. A coiled spring 9 connects the jaw 4 with the handle portion of member 1 and tends always to move the jaws apart.

Member 1 is provided on its longer end with an extension 10 against which the hand indicated in dotted lines at 11 bears. The end of member 3 is provided with a downwardly projecting lug 12 which not only serves to limit the sliding movement of the fingers on the member, but also may act as a fulcrum against the fixed support 13 to assist in locking the nut. In other words, if the nut is so hard that the ordinary grip of the hand is not sufficient to crack the same, the operator can place the device on a support as indicated in Fig. 1, and by utilizing the weight of the body as well as the grip of the hand, the nut can be easily cracked, hence the lug 12 becomes a fulcrum and aids in the operation.

To prevent any possibility of crushing the nuts, I provide in member 4 a set screw 14 which may be adjusted through the jaw, and at its free end engage the jaw 5. This screw therefore limits the movement of the jaws toward each other, so that a nut cannot be crushed. By adjusting this screw any size or character of nut may be cracked without danger of destroying the same. Pecans, walnuts, hickory nuts, and other similar nuts are difficult to crack with the ordinary nut crackers without crushing, as it requires considerable pressure to crack the nut and this pressure frequently crushes the nut. With my improvements it is absolutely impossible to crush the nut. If the nuts are large, the jaws will be given relatively small movement. If the nuts are small, the jaws will be given a greater movement, and the set screw is so constructed that it may be readily adjusted between the thumb and forefinger, and its position quickly varied to suit the size and crack of the nuts.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A nut cracker, comprising two members pivotally connected, said members having jaws at one end, both of said jaws having longitudinal series of teeth, the teeth of one jaw located out of register with the teeth of the other jaw, and a screw adjustable in one jaw and adapted to engage the other jaw between the teeth of the latter to limit the movement of said jaws toward each other, substantially as described.

2. A nut cracker, comprising two members pivotally connected, said members having jaws at one end, one of said jaws having longitudinal series of teeth at its side edges, the other jaw having a single longitudinal series of teeth at its central portion and having a screw-threaded opening adjacent the inner end of the series of teeth, and a screw in said opening having its inner end in position to engage the first-mentioned jaw between the series of teeth thereon and limit the movement of said jaws toward each other, substantially as described.

In testimony whereof I have signed my name to this specification in the presence of two subscribing witnesses.

LOUIS COSTA.

Witnesses:
M. E. DITTUS,
CHAS. E. POTTS.